United States Patent [19]

Hopkins

[11] 4,198,072
[45] Apr. 15, 1980

[54] WHEELED VEHICLE

[75] Inventor: Grant Hopkins, Walla Walla, Wash.

[73] Assignee: Mark Cantrell, Walla Walla, Wash.

[21] Appl. No.: 938,843

[22] Filed: Sep. 1, 1978

[51] Int. Cl.² .................. B62K 9/00; B62K 21/00
[52] U.S. Cl. .................. 280/267; 280/97;
 280/259; 280/281 LP; 280/282
[58] Field of Search .............. 280/282, 263, 267, 270,
 280/281 LP, 772, 661, 97, 11.27, 11.28, 259

[56] References Cited

U.S. PATENT DOCUMENTS

| | | | |
|---|---|---|---|
| 316,047 | 4/1885 | Marble | 280/261 |
| 356,095 | 1/1887 | Bouck | 280/238 |
| 3,069,182 | 12/1962 | Hufford | 280/87.01 |
| 3,282,606 | 11/1966 | Casner | 280/239 |
| 3,331,612 | 7/1967 | Tietge | 280/11.28 |
| 3,339,940 | 9/1967 | Anthony | 280/87.01 |
| 3,442,528 | 5/1969 | Rademacher | 280/87.04 |
| 3,620,547 | 11/1971 | Vaverek | 280/87.04 |

Primary Examiner—Joseph F. Peters, Jr.
Assistant Examiner—Randall A. Schrecengost
Attorney, Agent, or Firm—Wells, St. John & Roberts

[57] ABSTRACT

A wheeled vehicle powered by its rider to move about on three wheels. It includes a single front wheel and preferably a pair of rear wheels mounted to an elongated frame. The rear wheels are mounted to the frame by a carriage assembly that facilitates pivotal movement of the rear wheels about two axes. The first axis is a steering axis and the second is a steering control axis. The angle of the steering axis may be varied about the steering control axis. Through this arrangement, the rider is able to selectively control the steering response of the vehicle. If he shifts the steering axis to a position parallel with the ground surface he may maneuver the vehicle in wide sweeping high speed curves by leaning as does a bicyclist. The rear wheels merely track behind the front wheel and the frame tilts about the steering axis. If the rider shifts the steering axis to a position nearly perpendicular to the ground, he may negotiate short radius low speed turns. In this situation the rear wheels turn and the frame tilts in response to leaning by the rider. Shifting of the steering axis is accomplished by the rider as he moves between a sitting and a supine position.

17 Claims, 8 Drawing Figures

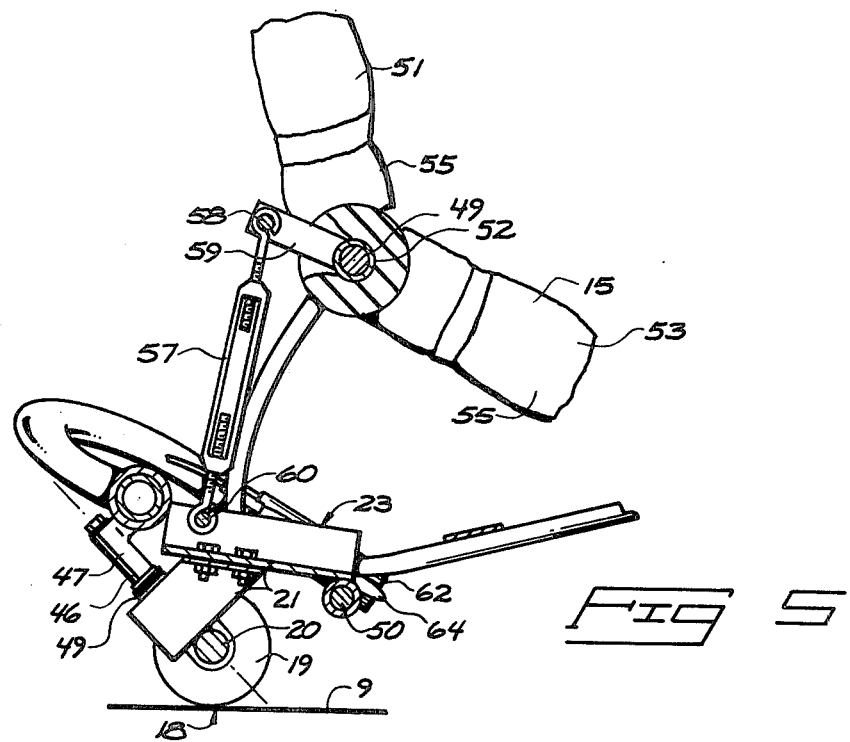
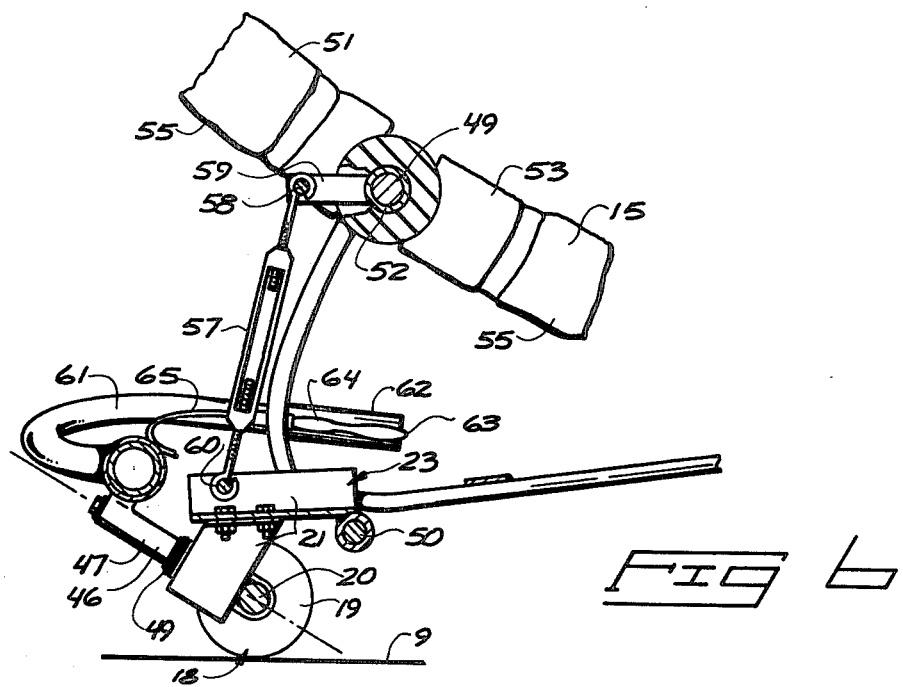

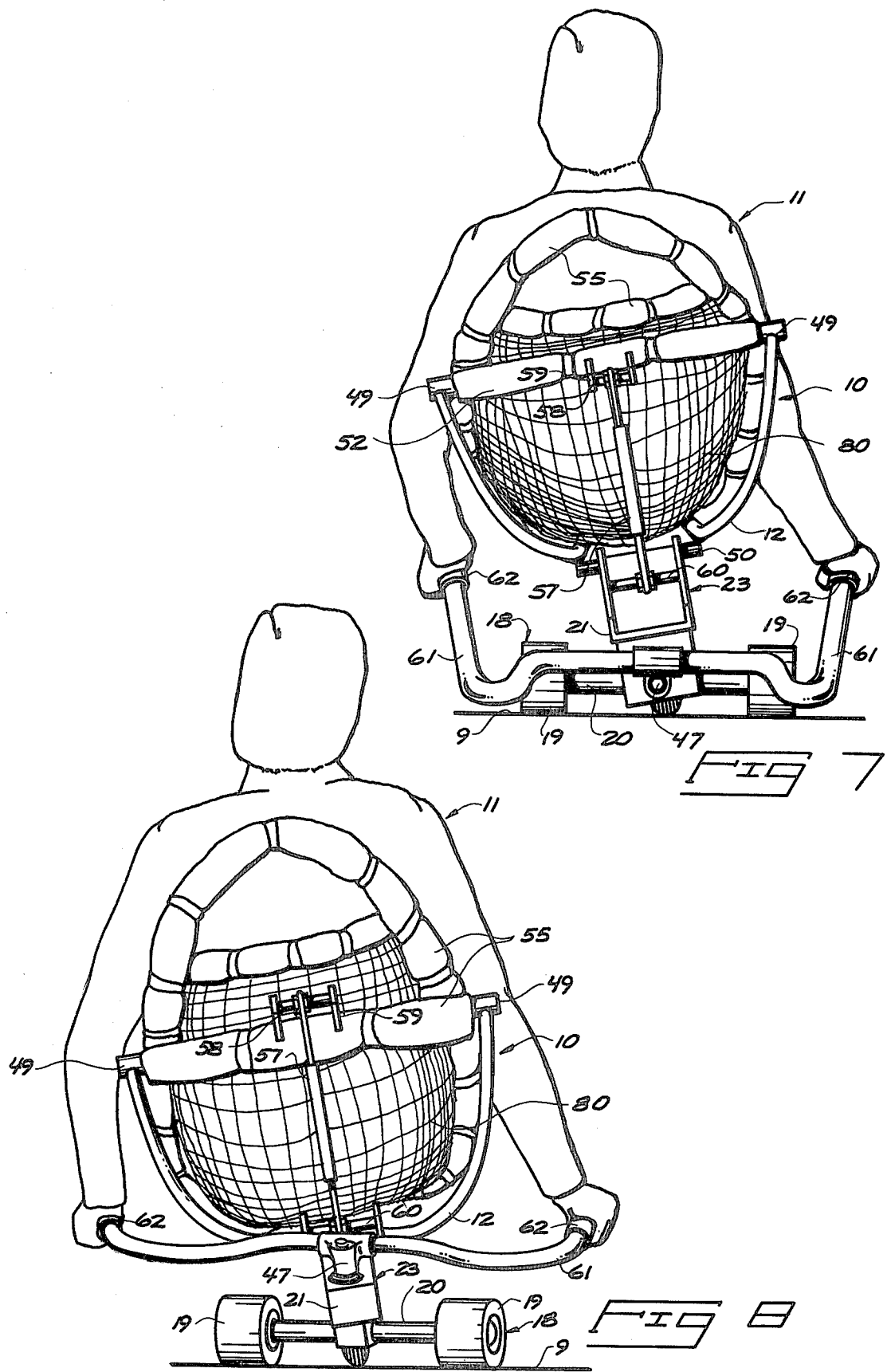

WHEELED VEHICLE

BACKGROUND OF THE INVENTION

The present invention is related generally to the field of wheeled vehicles and more particularly to such wheeled vehicles having a single forward driven wheel and a steerable pair of rear wheels.

For generations, youngsters have enjoyed riding tricycles. However, the advent of low slung molded plastic three-wheeled velocipedes that place the rider behind the front drive wheel rather than above it, has captured much of the standard tricycle market. In fact, the standard form of tricycle is quickly becoming an endangered species and the term "trike" is unknown to many youngsters.

The vehicles that are taking the place of "trikes" are both faster and more maneuverable. One needs only to watch a youngster maneuver his "Big Wheel" (TM) into a tight corner at high speed to understand their advantages.

The single most obvious problem with the newer forms of tricycles is that they are designed for youngsters, not for the adolescent to adult group. Adolescents must give up the vehicles they outgrow for the more "grownup" bicycle, leaving behind forever the thrill of scooting along inches from the ground surface.

Another important problem is that the modern "tricycles" are not typically designed to give the rider total control. Bicycles can be leaned into a curve to counteract centrifugal forces. It is primarily the rider rather than mechanical apparatus that initiates and actually produces the turning impetus. On the other hand, the typical tricycle, old or new, is designed with three point ground contact geometry to mechanically withstand such centrifugal forces without substantial assistance from the rider. When the centrifugal force overcomes the resistance produced by the tricycle geometry, the result is an outward slide or roll of the vehicle and rider. The point at which centrifugal outward force overcomes the resistance offered by the tricycle occurs so quickly that it is not generally within the capability of the rider to correct or compensate by shifting his body weight inwardly. It therefore becomes desirable to obtain such a vehicle that provides greater maneuverability than do standard tricycles and that gives the rider greater control over the apparatus in turns.

The maneuverability problem briefly discussed above has been realized to a limited extent by some manufacturers of the new forms of tricycles. Some designs provide rear steering wheels that are set about a fixed inclined steering axis. By doing this, the rider is able to turn the vehicle while simultaneously leaning it in the direction of turn; the sharper the turning radius, the greater the inclination into the turn. These forms of tricycles are an improvement over the fixed wheel variety, but still lack the desirable feature of adjustability for the angle of the steering axis. The rider is therefore still not allowed total vehicular control; steering conditions are the same regardless of the operating speed.

BRIEF DESCRIPTION OF THE DRAWINGS

FIG. 5 is a sectional view taken along line 5—5 in FIG. 4 showing one operational position of the elements therein;

FIG. 6 is a sectional view similar to FIG. 5 only showing a different operational positioning of the elements therein;

FIG. 7 is an enlarged rear elevational view showing one operational position; and FIG. 8 is a view similar to FIG. 7 only showing a different operational position.

DETAILED DESCRIPTION OF A PREFERRED EMBODIMENT

Figure 1:
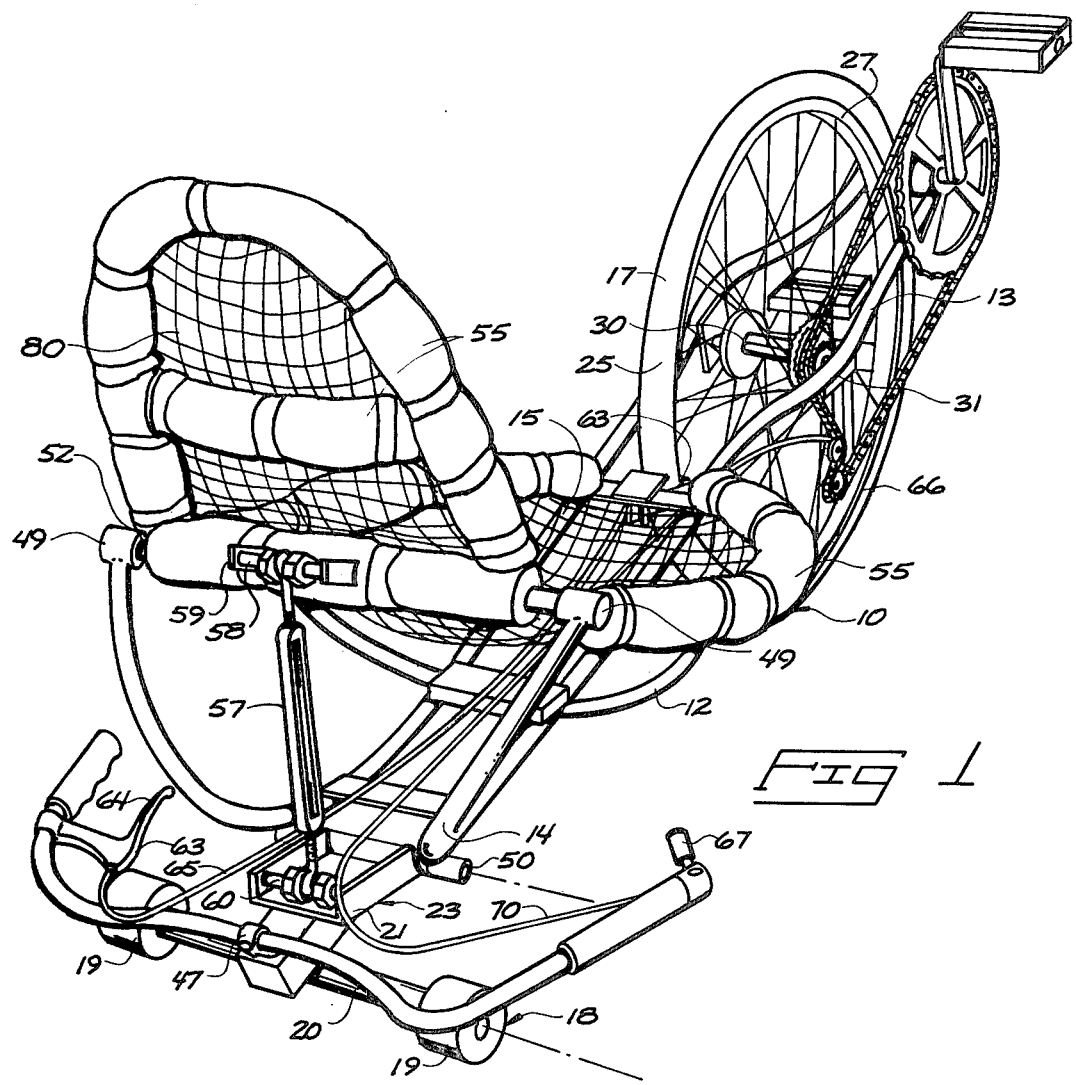
FIG. 1 is a pictorial view of the present vehicle in a preferred form.

A preferred form of the present invention is designated in the accompanying drawings by the reference character 10. The present vehicle 10 is of the tricycle variety for supporting a rider 11 in close proximity to the ground or other support surface 9.

The vehicle 10 includes an elongated frame 12 that extends from a forward end 13 to a rearward end 14. A seat 15 is provided intermediate the ends 13 and 14 as means for receiving and supporting the rider 11. It is integral with the frame 12. The seat 15 is situated rearward of a single front drive wheel 17. Seat 15 is also situated upwardly adjacent to a rearward ground engaging means 18. The vehicle is at least partially steerable through the ground engaging means 18 via a carriage means 23. Vehicle 10 is powered through a drive means 24 which, in a preferred form, is a bicycle drive train.

It may be noted that the front wheel 17 is a typical bicycle wheel having a pneumatic tire 25 positioned on a wire spoke supported rim 27. A central wheel hub 30 is mounted for free rotation by a mounting bracket 31 to the forward frame end 13. Bracket 30 mounts the wheel for free rotation on the frame 12 about a fixed horizontal axis. It will be noted that the wheel 17 will tilt with the frame 12 since bracket 31 is fixed to the frame. Therefore, any leaning of the frame relative to the ground surface will result in corresponding leaning of the wheel 17.

The front wheel 17 is powered through a drive means 14 which may be taken broadly to mean any appropriate driving mechanism including engines and electric motors. However, it is preferred that the drive mechanism be a drive train similar to that currently utilized in conjunction with bicycles. The preferred drive train therefore consists of a crankset 32, a sprocket 40 on hub 30, and a chain 41 interconnecting the sprocket 40 with the crankset 32. The crankset 32 is comprised of a pair of oppositely extending crank arms 34 having pedals 35 mounted at their outward ends. The crank arms 34 are mounted at inward ends to a sprocket 36. The sprocket 36 is rotatably carried by appropriate bearings 37 (FIG. 2) forward of the wheel axis. Positioning of the crankset axis forward of wheel 17 decreases the necessary overall length of the vehicle. Since there is a relatively short distance between the front wheel axis and that of the rear ground engaging means 18, maneuverability is correspondingly increased.

Rear ground engaging means 18 is so named as to broadly include any form of device or mechanism for moveably supporting the rear frame end above a ground surface 9. It may therefore include ski structures (not shown) for movement along snow or ice, or ice runners (also not shown) strictly for ice travel, or wheels 19 as shown in the drawings.

The pair of rear wheels 19 are mounted in spaced relation along an axle member 20. They rotate freely and coaxially on the axle member 20 through provision of appropriate bearings (not shown).

The rear wheels 18 are freely rotatably mounted to axle 20. The axle 20, in turn, is mounted to the frame by a carriage means 23. Carriage means 23 is designed to allow pivotal movement of the axle about two separate axes; a steering axis and a steering control axis. The carriage means includes a conventional headset 47 and a carriage bracket 21 that is pivotally mounted to frame 12. The headset includes a central stem 46 journalled by a bushing 49 within bracket 21. The bushing 49 and stem 46 define the steering axis about which the wheels 19 may be turned, depending upon the angular relationship of the steering axis with the ground surface. Axle member 20 and headset stem 47 are arranged so wheels 19 are spaced equal distances from the steering axis. The steering axis is situated in a vertical plane and is laterally centered below the seat 15.

The angular relationship of the steering axis with the ground surface may be varied about the steering control axis. The carriage bracket 21 is mounted to frame 12 at a pivot 50 which defines the steering control axis. It is this provision that facilitates additional control and maneuverability that is absent in prior known vehicles.

FIGS. 2 and 5 through 7 graphically illustrate the functional characteristics of the carriage means 23. In FIGS. 2, 5, 6, and 8, the steering axis has been adjusted to an acute angle with respect to the ground surface. The angle of the steering axis is such that any leaning of the frame will cause corresponding turning of the wheels about the wheel axis. In FIG. 7 the carriage means has functioned to shift the steering axis about the steering control axis to a position parallel with the ground. This enables free pivotal movement of the frame without corresponding steering pivotal movement of the wheels 19 relative to the frame. A stop means (not shown) may be provided between relatively pivotal elements, as the carriage and frame, to limit angular movement of the bracket between the two extreme positions. The variability of adjustability of the steering axis will be discussed more in terms of operation following the remainder of this technical description.

Figure 2:
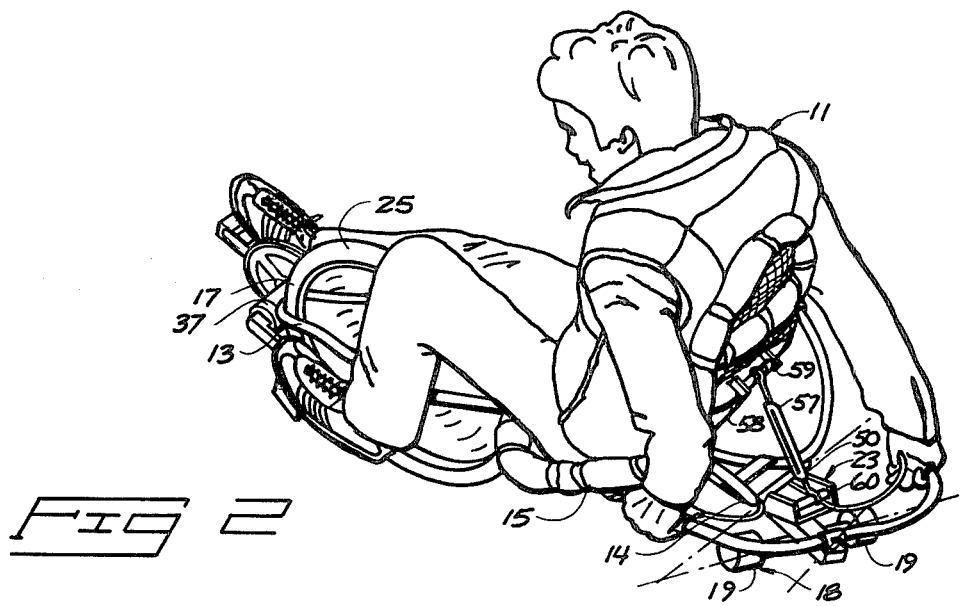
FIG. 2 is a pictorial view of the vehicle and a rider.
Figure 3:
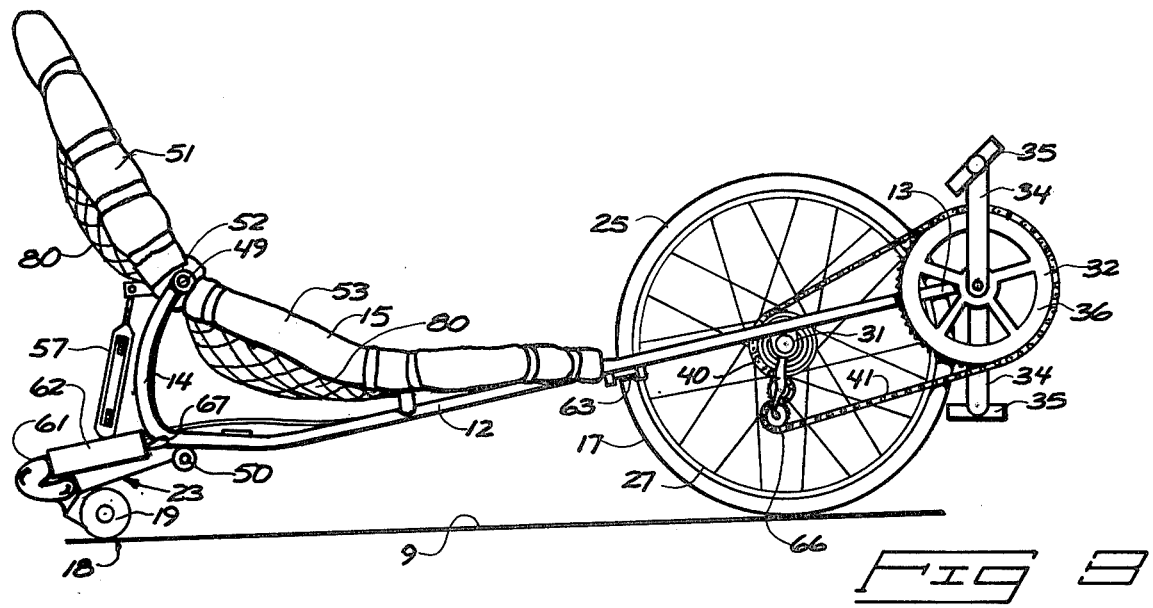
FIG. 3 is a side elevation view.
Figure 4:
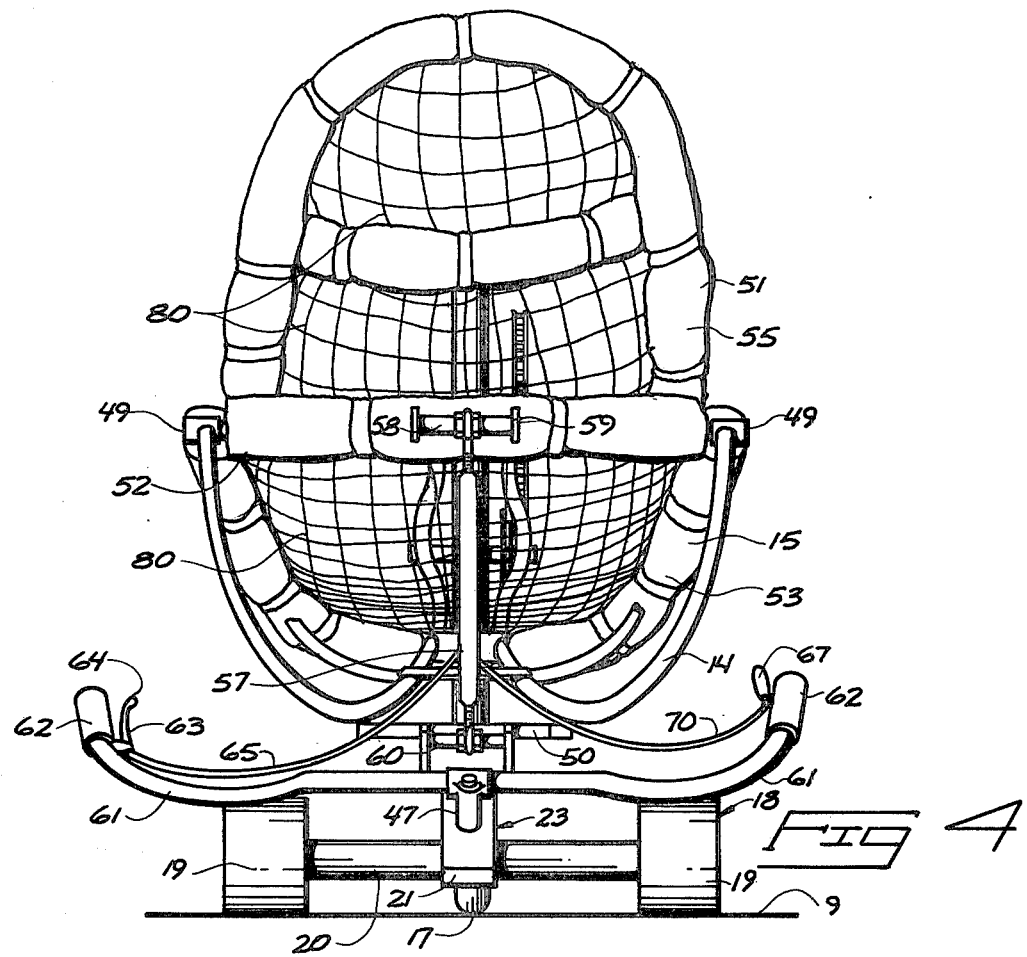
FIG. 4 is an enlarged rear elevational view.

In a preferred form, the carriage means 23 also includes a transverse handlebar 61 extending outwardly of the headset stem 47. The handlebar 61 extends outwardly from the headset to handles 62 at opposite sides of the frame 12. The handles 62 are located outwardly and adjacent to the rider's hips as he sits on the seat 15. Positioning of the handles 62 may vary by provision of appropriate adjustment mechanisms of the headset stem 47. However, I have found a position similar to that illustrated in FIG. 2 is preferred. With this positioning of the handles, the rider is able to balance himself and, if required, exert controlling forces against the handlebars in addition to the control provided by leaning in the direction of the desired turn.

The seat 15 is provided in two sections, a back support section 31 and a hip support section 53. The two sections 51 and 53 are joined at a pivot 49 which is defined by a transverse cross member 52. Pivot 49 is situated about a horizontal back support pivot axis that is nearly vertically above and parallel to the steering control axis. The rider is therefore able to change the angular position of the back support section merely by leaning backward or forward.

A link means 57 interconnects the back support 51 and carriage bracket 21. Link means 57 is provided to directly relay pivotal movement of the back support to the carriage means 23. The link means 57 is connected at a pivot 58 on the back support and at a pivot 60 on carriage bracket 21. The pivot 58 is situated on a bracket 59 rearward of the seat pivot axis and pivot 60 is similarly situated rearward of the adjacent steering control axis on bracket 21. Therefore, up and downward pivotal movement of the back support will result in direct corresponding up and downward pivotal movement of the carriage means. The rider 11 may, by leaning back or forwardly, pivot the rear wheels about the steering control axis.

It may be noted that the link means is comprised of a turnbuckle that may be adjusted lengthwise to determine the limits through which the rider may move the back support.

Seat 15 is integral with the frame 12 which is formed preferably of lightweight structural tubular material. The frame includes a peripheral configuration at the seat area 15 and is covered by a shock-absorbent padding 55. The configuration of the peripheral tubular frame 12 is provided to conform with the shape of the rider's hips and upper back. The cross member 52 connects opposite sides of the frame 12 and spans the frame at about halfway between the rider's shoulders and hips.

A flexible fabric 80 may be provided spanning the frame area at the seat 15. The fabric is preferably a net-like structure such as typically utilized in hammocks. However, it is entirely conceivable that the seat structure may be formed of one piece synthetic resin or other shaped material that will conform to the hips and back of a rider.

A braking mechanism 63 is provided that may be interconnected between the front drive wheel 17 and carriage means 23 for selectively slowing or stopping the vehicle. The braking mechanism 63 includes a conventional form of brake lever 64 that is connected through a cable 65 to a standard form of caliper bicycle brake 65. The braking mechanism 65 is situated on frame 12 rearwardly adjacent to the front wheel axis.

The vehicle shown also includes a manually shiftable transmission 66. This device is comprised of a conventional form of shift control lever 67 mounted to the handle 62. A control cable 70 extends forwardly to the working elements of the transmission. The transmission 66 may be comprised of several selected sprockets mounted to the hub and a derailleur that operates through the lever to change position of the chain to a selected sprocket. This assembly is shown only basically and will not be discussed in greater detail since such mechanisms are well known in the bicycle transmission art.

It may be noted at this point that the various mechanisms described herein may include different adjustment and design features that are not shown in the drawings or are not discussed in greater detail. For example, it may be preferred that the carriage bracket 21 be provided in two selectively adjustable sections to facilitate adjustment of the distance between the steering control axis and the axis of wheels 19. It may also be desirable to provide a longitudinal adjustment feature that allows selective positioning of the entire carriage means 23 along the length of frame 12. Stops and retainer springs can also be selectively positioned between the frame 12 and carriage means 23 to limit movement and yieldably retain the back support section in a normal upright position. These and many other adjustment and modification features, although not shown, are contemplated by the applicant and have been omitted for the purpose of brevity and clarity in describing the several basic features that comprise the invention.

From the above description, operation of the present vehicle may now be understood.

The vehicle is mounted by standing over the seat 15 astride the front wheel 17. The rider may seat himself with feet extending forwardly in contact with the pedals of crankset 32. The rider's hands grasp the handles 62. No additional support is required and the rider may sit stationary on the vehicle without touching the ground surface. This is so because of the spaced relation of the rear wheels 19. Balance may be further maintained by slight hand pressure applied to either or both of the handlebars.

To initiate forward progress of the vehicle, the rider pushes the pedals similarly as one would in riding a bicycle. The driving force produced through drive means 24 is transmitted to the drive wheel 17.

Maneuvering of the vehicle is accomplished by leaning in the direction of desired turn. The selected angular relationship of the steering axis to the ground surface enables the rider to both turn the rear wheels and lean simultaneously. The rider may select any position between a supine and sitting position, depending upon the speed and type of maneuver desired. Basically, the vehicle is leaned into the turn along with the drive wheel 17 and the weight of the rider is shifted inward on the turning radius or path produced by the wheels. Therefore, the centrifugal forces produced during the turn are counteracted or negated by the shifting of the rider's weight.

With the back support set in the full recline or supine position, the steering axis is shifted to a condition parallel with the ground surface. In this situation when the rider leans into a corner, the rear wheels do not affect the resulting turn. In this position, turning is achieved by the lean of the rider rather than by turning of the rear wheels and axle. This position is critical for high speed, enabling the rider to lean into a turn similar to the way a bicyclist would lean into a high speed turn. The rear wheels merely track behind the front wheel and the turning is effected by shifting of the rider's weight. Wide, high-speed turns and straightforward riding is preferably accomplished with the steering axis in this position. This position also enables a rider to correct the attitude of the vehicle on a banked surface. A rider is shown in FIG. 7 with the backrest fully reclined and the steering axis situated in a plane horizontal to the support surface. There it may be seen that the rear wheels have not turned in response to leaning of the vehicle frame.

As the rider shifts his position from the supine position of FIG. 7 toward a sitting position in FIG. 8, the pivoting back support correspondingly operates through the link mechanism to shift the steering axis about the steering control axis. As the angle of the steering axis increases with respect to the ground surface, the amount of turning of the rear wheels (in response to lean or tilt of the vehicle frame due to the rider shifting weight) increases. If the steering axis were allowed to pivot to a position perpendicular with the ground surface, steering would be accomplished solely by turning of the handlebars with no leaning of the rider involved whatsoever. It is preferred, however, to limit the upward pivotal movement of the steering axis to an angle of approximately 75° with the ground surface. This allows sufficient maneuverability along with a certain amount of lean which the rider may prefer during slow speed, tight maneuvers.

Obviously, an infinite number of positions are available between the two extreme positions described above. A slow movement from reclining to sitting or from sitting to reclining, gradually shifts the axis and allows the rider to "trim" the vehicle smoothly into and out of turns. As the turning radius decreases, the rider moves gradually toward a sitting position. As the turning radius increases, he shifts his back rearwardly to assume a supine position.

The brake mechanism and shifting provision enable the rider to control the speed of the device with his hands. The rider's hands are also utilized during operation to provide a certain degree of balance. Actually, however, the vehicle may be operated with no hands touching the handgrips. Maneuvering is accomplished almost totally by the rider leaning in one direction or another.

The above description has been given to set forth a preferred example of the present invention. It is not by any means to be taken as being restrictive upon the scope of my invention. Only the claims following this specification are to be taken as strict definitions of my invention.

What I claim is:

1. A wheeled vehicle comprising:
   an elongated frame having a forward end and a rearward end;
   seat means at the rearward end of the frame for receiving and supporting a rider;
   a ground engaging drive wheel mounted to the forward end of the frame for rotation about a fixed drive wheel axis;
   means for transmitting driving power to the drive wheel while the vehicle is in use;
   a pair of rear ground-engaging wheels located at opposite sides of the frame;
   a transverse axle rotatably mounting the rear ground-engaging wheels about individual rear wheel axes; and
   carriage means movably mounting the axle to the rearward end of the frame for permitting the rider to pivotally adjust the axle relative to the frame while the vehicle is in use by (a) pivotal movement of the axle about a steering axis located within a vertical plane, and (b) by pivotal movement of the axle about a steering control axis about which the steering axis may be angularly adjusted within said vertical plane relative to the ground surface.

2. The vehicle as defined by claim 1 wherein said carriage means comprises:
   a bracket pivotally mounted to the frame about an axis parallel to the individual rear wheel axes;
   and a support on said bracket pivotally connecting the axle to the bracket about the steering axis.

3. A wheeled vehicle comprising:
   an elongated frame having a forward end and a rearward end;
   seat means at the rearward end of the frame for receiving and supporting a rider;
   a ground engaging drive wheel mounted to the forward end of the frame for rotation about a fixed drive wheel axis;
   means for transmitting driving power to the drive wheel while the vehicle is in use;

rear ground engaging means for moveably supporting the rearward frame end above a ground surface;

an axle mounting the rear ground engaging means; and carriage means movably mounting the axle to the rearward end of the frame for permitting the rider to pivotally adjust the axle relative to the frame while the vehicle is in use by (a) pivotal movement of the axle about a steering axis located within a vertical plane and (b) by pivotal movement of the axle about a steering control axis about which the steering axis may be angularly adjusted within said vertical plane relative to the ground surface.

4. The vehicle as defined by claim 3 wherein the seat means includes a back support section and a hip support section joined together for pivotal movement about a transverse back support pivot axis;

wherein the back support pivot axis is parallel to the steering control axis and further comprising link means interconnecting the back support section and carriage means for transmitting pivotal movement of the back support section to the carriage means to thereby cause corresponding angular change of the steering axis relative to the ground surface.

5. The vehicle as defined by claim 3 wherein the carriage means includes a handlebar mounted in fixed relation to the axle and extending therefrom transversely outward to handgrips at opposite sides of the seat means.

6. The vehicle as defined by claim 3 wherein the rear ground engaging means is situated below the seat means and is located on opposite side of the steering axis and wherein the steering axis is situated within a vertical plane at the transverse center of the seat means.

7. The vehicle as defined by claim 6 wherein the seat means includes a back support section and a hip support section joined together for pivotal movement about a transverse back support pivot axis;

wherein the back support pivot axis is parallel to the steering control axis and further comprising link means interconnecting the back support section and carriage means for transmitting pivotal movement of the back support section to the carriage means to thereby cause corresponding angular change of the steering axis relative to the ground surface.

8. The vehicle as defined by claim 3 wherein the carriage means includes a bicycle headset mounting the axle for pivotal movement about the steering axis and wherein the headset includes a central stem mounting the axle; a bushing mounting the stem and defining the steering axis about which the stem and axle are pivoted; and a handlebar arrangement mounted to the stem and protruding laterally outward therefrom.

9. The vehicle as defined by claim 8 wherein the carriage means further includes a carriage bracket for receiving the bushing and wherein the mounting bracket is mounted at a pivot to the frame, the pivot defining the steering control axis.

10. The vehicle as defined by claim 9 wherein the seat means includes a back support section and a hip support section joined together for pivotal movement about a back support pivot axis that is parallel to the steering control axis and wherein a link means is provided interconnecting the back support section and the carriage bracket for transmitting pivotal movement of the back support section to the carriage bracket, thereby causing corresponding pivotal movement of the carriage bracket and attached rear wheels about the steering control axis.

11. A wheeled vehicle, comprising:

an elongated frame having a forward end and a rearward end;

seat means at the rearward end of the frame for receiving and supporting a rider;

said seat means including a hip rest section and a backrest section joined to one another for pivotal movement about a transverse axis;

a ground engaging drive wheel mounted to the forward end of the frame for rotation about a fixed transverse drive wheel axis;

means for transmitting driving power to the drive wheel;

rear ground engaging means for moveably supporting the rearward frame end above the ground surface;

an axle mounting the rear ground engaging means for free motion along the ground surface;

a carriage bracket mounted to the frame and carrying said axle at the rearward end thereof for pivotal movement thereon about a transverse steering control axis;

a headset pivotably mounting the side to the carriage bracket for pivotal movement about a longitudinal steering axis; and link means interconnecting the back support section and the carriage bracket for transmitting pivotal movement of the back support section to the carriage bracket for selectively varying the angle of the steering axis relative to the ground surface.

12. The vehicle as set out by claim 11 wherein the carriage bracket is designed to permit angular movement of the rear ground engaging means about the steering control axis between a position wherein the steering axis is parallel with the ground surface and a position wherein the steering axis is nearly perpendicular to the ground surface.

13. The vehicle as defined by claim 11 wherein the carriage means includes a handlebar mounted in fixed relation to the axle and extending therefrom transversely outward to handgrips at opposite sides of the seat means.

14. The vehicle as defined by claim 11 wherein the carriage means includes a bicycle headset mounting the axle for pivotal movement about the steering axis and wherein the headset includes a central stem mounting the axle; a bushing mounting the stem and defining the steering axis about which the stem and axle are pivoted; and a handlebar arrangement mounted to the stem and protruding laterally outward therefrom.

15. The vehicle as defined by claim 11 wherein the ground engaging means is comprised of a pair of freely rotatable wheels on the axle and wherein the steering axis intersects the axis of the wheels.

16. The vehicle as defined by claim 11 wherein the link means is comprised of a turnbuckle pivotably mounted at one end to the back support section rearward of the transverse axis about which the back support section pivots, and pivotally mounted at its remaining end to the carriage bracket rearward of the steering control axis.

17. The vehicle as defined by claim 11 wherein the means for transmitting driving power to the drive wheel is comprised of a bicycle crank set including pedals and cranks rotatably mounted to the frame forward of the drive wheel, with the pedals extending transversely to opposite sides of the drive wheel.

* * * * *